US012665111B2

(12) United States Patent
Suetsuna et al.

(10) Patent No.: US 12,665,111 B2
(45) Date of Patent: Jun. 23, 2026

(54) MAGNETIC MATERIAL AND ROTATING ELECTRIC MACHINE

(71) Applicant: KABUSHIKI KAISHA TOSHIBA, Tokyo (JP)

(72) Inventors: Tomohiro Suetsuna, Kawasaki (JP); Naoyuki Sanada, Kawasaki (JP); Hiroaki Kinouchi, Meguro (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 632 days.

(21) Appl. No.: 18/176,588

(22) Filed: Mar. 1, 2023

(65) Prior Publication Data

US 2023/0290548 A1 Sep. 14, 2023

(30) Foreign Application Priority Data

Mar. 14, 2022 (JP) ................................. 2022-039090
Dec. 7, 2022 (JP) ................................. 2022-195701

(51) Int. Cl.
$H01F\ 1/147$ (2006.01)
$C22C\ 38/02$ (2006.01)
$C22C\ 38/10$ (2006.01)
$C22C\ 38/12$ (2006.01)
$H02K\ 1/02$ (2006.01)

(52) U.S. Cl.
CPC ......... $H01F\ 1/14741$ (2013.01); $C22C\ 38/02$ (2013.01); $C22C\ 38/10$ (2013.01); $C22C\ 38/12$ (2013.01); $H02K\ 1/02$ (2013.01); $C22C\ 2202/02$ (2013.01)

(58) Field of Classification Search
CPC .................................................. H01F 1/14741
See application file for complete search history.

(56) References Cited

U.S. PATENT DOCUMENTS

| | | | |
|---|---|---|---|
| 2005/0044987 A1 | 3/2005 | Takayama et al. | |
| 2009/0010795 A1* | 1/2009 | Tidesten | ................. C22C 38/22 |
| | | | 148/621 |
| 2009/0295518 A1 | 12/2009 | Nishi et al. | |
| 2011/0272065 A1 | 11/2011 | Ohta et al. | |
| 2013/0228716 A1 | 9/2013 | Suetsuna et al. | |
| 2017/0076845 A1 | 3/2017 | Suetsuna et al. | |
| 2017/0209924 A1 | 7/2017 | Suetsuna et al. | |
| 2018/0258513 A1 | 9/2018 | Suetsuna et al. | |

(Continued)

FOREIGN PATENT DOCUMENTS

| | | |
|---|---|---|
| JP | 2004-211132 A | 7/2004 |
| JP | 2009-164401 A | 7/2009 |

(Continued)

OTHER PUBLICATIONS

Ashbrook, et al. Development of a cobalt-tungsten ferromagnetic, high-temperature, structural alloy. No. NASA-TN-D-4338. 1968.*

(Continued)

*Primary Examiner* — Christopher S Kessler
(74) *Attorney, Agent, or Firm* — Oblon, McClelland, Maier & Neustadt, L.L.P.

(57) ABSTRACT

A magnetic material according to an embodiment includes at least one first element X selected from the group consisting of Fe, Co and Ni; a matrix phase; and a particle including C and at least one second element Y selected from Ta, W, Nb and Mo.

22 Claims, 10 Drawing Sheets surface portion
precipitated particle (surface)
100
8 2 4 6
precipitated particle (in the grain)
precipitated particle (grain boundaries)
central portion

(56) References Cited

U.S. PATENT DOCUMENTS

| | | |
|---|---|---|
| 2019/0076926 A1 | 3/2019 | Imano et al. |
| 2019/0078184 A1* | 3/2019 | Sandberg ................ C22C 38/02 |
| 2019/0238021 A1 | 8/2019 | Kinouchi et al. |
| 2019/0283127 A1 | 9/2019 | Kinouchi et al. |
| 2020/0035391 A1 | 1/2020 | Suetsuna et al. |
| 2020/0043639 A1 | 2/2020 | Suetsuna et al. |
| 2020/0082963 A1 | 3/2020 | Suetsuna et al. |
| 2020/0303106 A1 | 9/2020 | Suetsuna et al. |
| 2020/0340087 A1 | 10/2020 | Suetsuna et al. |
| 2021/0082608 A1 | 3/2021 | Sanada et al. |
| 2021/0305851 A1 | 9/2021 | Sanada et al. |
| 2022/0072606 A1 | 3/2022 | Suetsuna et al. |
| 2022/0085669 A1 | 3/2022 | Kinouchi et al. |
| 2022/0293314 A1* | 9/2022 | Liu ......................... C22C 45/02 |
| 2022/0298613 A1 | 9/2022 | Hagiwara et al. |

FOREIGN PATENT DOCUMENTS

| | | |
|---|---|---|
| JP | 2010-10673 A | 1/2010 |
| JP | 2010-189761 A | 9/2010 |
| JP | 2013-65844 A | 4/2013 |
| JP | 2013-185162 A | 9/2013 |
| JP | 2015-103770 A | 6/2015 |
| JP | 2017-59816 A | 3/2017 |
| JP | 2017-135358 A | 8/2017 |
| JP | 2018-152449 A | 9/2018 |
| JP | 2019-49022 A | 3/2019 |
| JP | 2019-58014 A | 4/2019 |
| JP | 2019-161183 A | 9/2019 |
| JP | 2020-25077 A | 2/2020 |
| JP | 2020-43268 A | 3/2020 |
| JP | 2020-155525 A | 9/2020 |
| JP | 2021-48238 A | 3/2021 |
| JP | 2021-123750 A | 8/2021 |
| JP | 2021-147651 A | 9/2021 |
| JP | 2022-43455 A | 3/2022 |
| JP | 2022-49889 A | 3/2022 |
| JP | 2022-146029 A | 10/2022 |
| JP | 2023-132116 A | 9/2023 |
| WO | WO 2019/058602 A1 | 3/2019 |

OTHER PUBLICATIONS

Halder, N.C. et al. "Separation of particle size and lattice strain in integral breadth measurements", Acta. Cryst. (1966) 20 pp. 312-313 (2 pages).

* cited by examiner

CONTROL SYSTEM BASED ON PLL

CONTROL SYSTEM BASED ON INVERTER

WOUND WIRE

STATOR

ROTOR

PHASE B

PHASE C

PHASE A

OUTPUT AXIS

PHASE D

WOUND WIRE

200

SCHEMATIC DIAGRAM OF STATOR

CORE (MAGNETIC MATERIAL)

WOUND WIRE

EXAMPLE OF DIRECTION OF MAGNETIC FLUX

300

SCHEMATIC DIAGRAM OF ROTOR

FIG.8

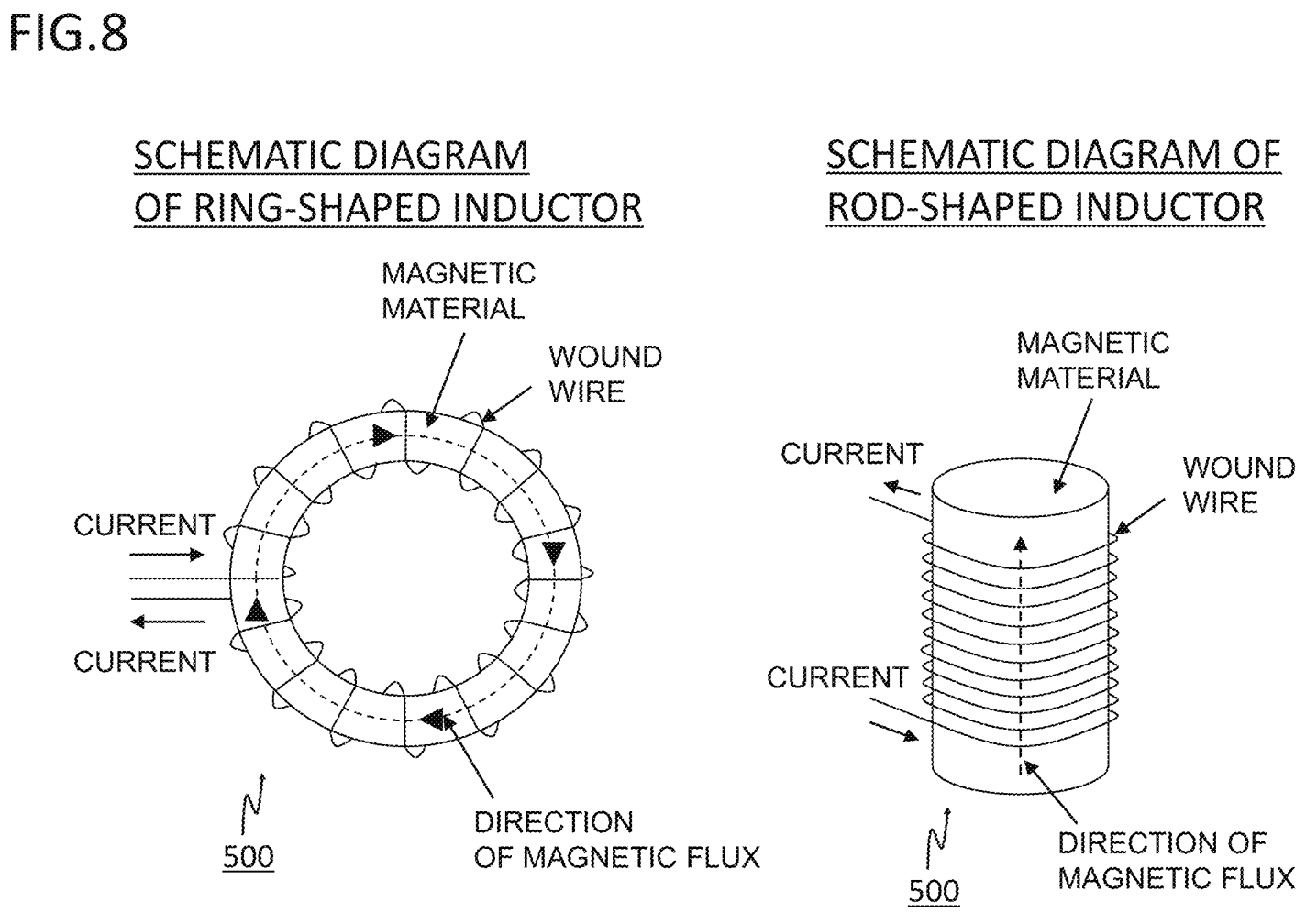

SCHEMATIC DIAGRAM OF
ROD-SHAPED INDUCTOR

MAGNETIC
MATERIAL

WOUND
WIRE

CURRENT

CURRENT

DIRECTION OF
MAGNETIC FLUX

500

SCHEMATIC DIAGRAM
OF RING-SHAPED INDUCTOR

MAGNETIC
MATERIAL

WOUND
WIRE

CURRENT

CURRENT

DIRECTION
OF MAGNETIC FLUX

500

SCHEMATIC CROSS-SECTIONAL VIEW
OF CHIP INDUCTOR

MAGNETIC MATERIAL

DIRECTION OF
MAGNETIC FLUX

COIL-WOUND WIRE

500

SCHEMATIC DIAGRAM
OF PLANAR INDUCTOR

MAGNETIC MATERIAL

COIL-WOUND WIRE PATTERN

500

MAGNETIC MATERIAL AND ROTATING ELECTRIC MACHINE

CROSS-REFERENCE TO RELATED APPLICATION

This application is based upon and claims the benefit of priority from Japanese Patent Application 2022-039090, filed on Mar. 14, 2022, and Japanese Patent Application 2022-195701, filed on Dec. 7, 2022, the entire contents of which are incorporated herein by reference.

FIELD

Embodiments described herein relate generally to magnetic material and rotating electrical machine.

BACKGROUND

Currently, soft magnetic materials are applied to the component parts of various systems, cores of devices, magnetic wedges such as rotating electric machine (e.g., motors, generators, etc.), transformers, inductors, transformers, magnetic inks, antenna devices. Thus, soft magnetic materials are regarded as very important materials. Incidentally, the magnetic wedge is a lid of the slot portion for inserting the coil in the rotating electric machine or the like. Usually, non-magnetic wedges are used; however, when magnetic wedges are employed, the sparseness or denseness of the magnetic flux density is moderated, the harmonic loss is reduced, and the motor efficiency is increased. In the soft magnetic materials, in the frequency band used, high permeability and low loss is required, and high saturation magnetization is also required to prevent magnetic saturation. The loss is mainly composed of hysteresis loss and eddy current loss. The magnetic coercivity reduction is important for hysteresis loss reduction. For eddy current loss reduction, improvement of electrical resistivity, reduction of size of metallic components, etc. are important. Furthermore, examples of other characteristics that are required when magnetic materials are incorporated into the various systems and devices include high thermal stability, high strength, and high toughness. Also, in order for the magnetic materials and sintered body to be applied to complex shapes, a pressed powder body is more preferable than materials having a sheet shape or a ribbon shape. However, generally, in the case of a pressed powder body or a sintered body, it is known that characteristics such as saturation magnetization, magnetic permeability, losses, strength, toughness, and hardness are deteriorated. Thus, enhancement of characteristics is preferable.

Next, in regard to existing soft magnetic materials, the types of the soft magnetic materials and their problems will be described. Examples of an existing soft magnetic material for systems of 10 kH or less include a silicon steel sheet (FeSi). A silicon steel sheet is a material that is employed in most of rotating electric machines that have been used for a long time and handle large power, and the core materials of transformers. Characteristics enhancement from non-directional silicon steel sheets to directional silicon steel sheets can be attempted, and compared to the early stage of discovery, a progress has been made; however, in recent years, it is considered that characteristics improvement has reached an endpoint. Regarding the characteristics, it is particularly critical to simultaneously satisfy high saturation magnetization, high magnetic permeability, and low losses. Studies on materials that surpass silicon steel sheets are actively conducted globally, mainly based on the compositions of amorphous materials and nanocrystalline materials; however, a material composition that surpasses silicon steel sheets in all aspects has not yet been found. Furthermore, studies also have been conducted on a pressed powder body and a sintered body that are applicable to complex shapes; however, pressed powder bodies and sintered bodies have a defect that they have poor characteristics compared to sheets or ribbons.

Examples of existing soft magnetic materials for systems of 10 kHz to 100 kHz include Sendust (Fe—Si—Al), nanocrystalline FINEMET (Fe—Si—B—Cu—Nb), ribbons or pressed powder bodies of Fe-based or Co-based amorphous glass, and MnZn-based ferrite materials. However, all of these materials do not completely satisfy characteristics such as high magnetic permeability, low losses, high saturation magnetization, high thermal stability, high strength, high toughness, and, and the materials are insufficient.

Examples of existing soft magnetic materials of 100 kHz or higher (MHz frequency band or higher) include NiZn-based ferrites and hexagonal ferrites; however, these materials have insufficient magnetic characteristics at high frequency.

From the circumstances described above, development of a magnetic material having high saturation magnetization, high magnetic permeability, low losses, high thermal stability, and excellent mechanical characteristics is preferable. In particular, development of a magnetic material having characteristics of high saturation magnetization, low losses, high thermal stability, and high strength, is preferable.

BRIEF DESCRIPTION OF THE DRAWINGS

FIG. 8 is a conceptual diagram of inductors (ring-shaped inductor and rod-shaped inductor) according to the second embodiment.

DETAILED DESCRIPTION

Figure 1:
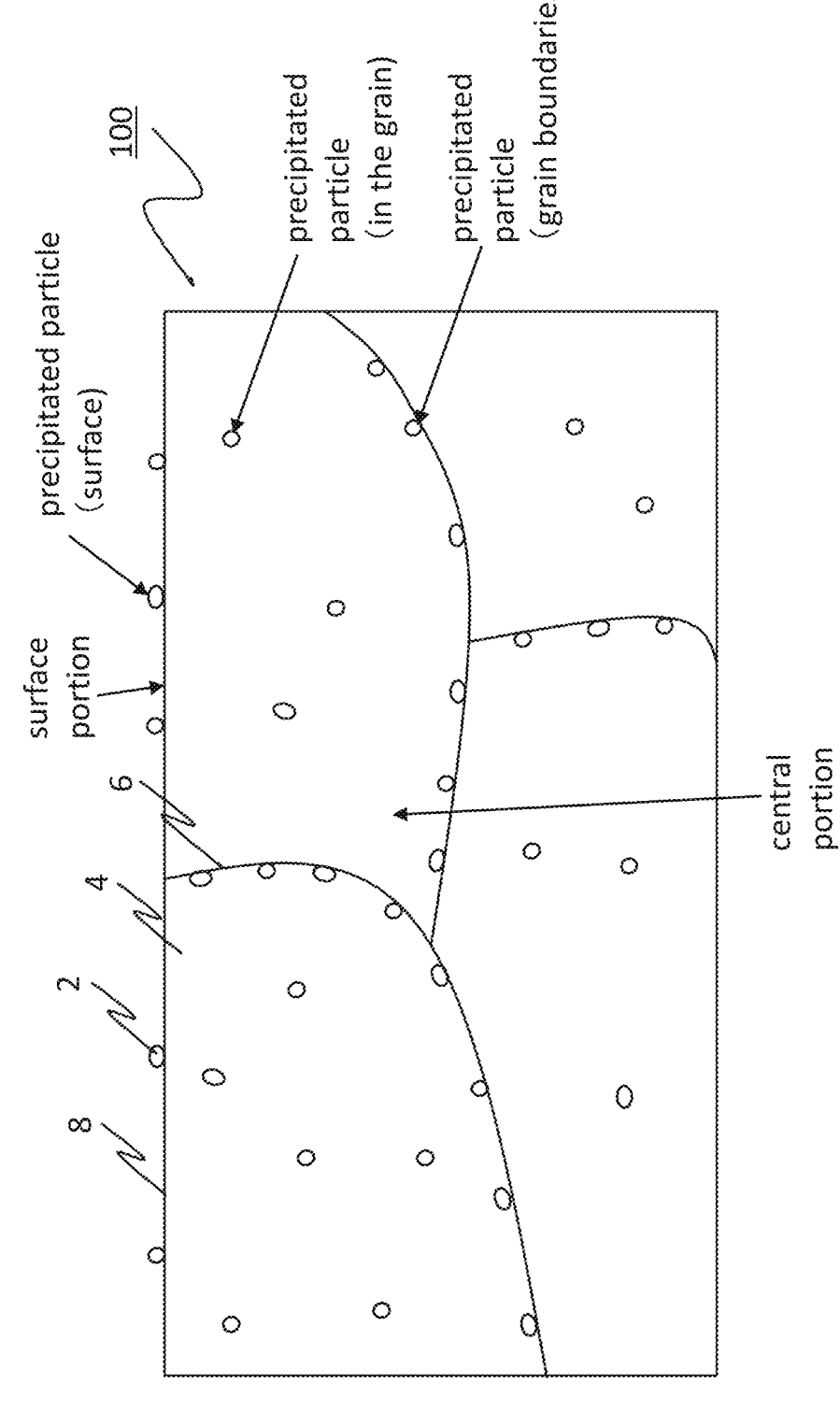
FIG. 1 is a schematic diagram indicating the form of a precipitated particle in the magnetic material of the first embodiment.

A magnetic material according to an embodiment includes: at least one first element X selected from the group consisting of Fe, Co and Ni; a matrix phase; a particle including C and at least one second element Y selected from Ta, W, Nb and Mo.

In the following description, embodiments will be described using the attached drawings. In the drawings, the same or similar parts are denoted by the same or similar reference numerals.

First Embodiment

The magnetic material according to the present embodiment includes: at least one first element X selected from the group consisting of Fe, Co and Ni; a matrix phase; and a precipitated particle including Ta and C.

The magnetic material according to the present embodiment includes: at least one first element X selected from the group consisting of Fe, Co and Ni; a matrix phase; and a particle including C and at least one second element Y selected from Ta, W, Nb and Mo. The particulate is also referred to as the precipitated particle.

In addition, it is preferable that the particle has the cubic crystal structure, includes the first element X, and has the compound phase of $X_3Y_3C$ type. For example, it is preferable to have a $Ta_3Co_3C$, $Nb_3Fe_3C$, $Nb_3Co_3C$, $W_3Fe_3C$, $W_3Co_3C$, $W_3Ni_3C$, $Mo_3Fe_3C$, $Mo_3Co_3C$, $Mo_3Ni_3C$, or the like compound phase. In this case, it is more preferable that the crystalline structure has the Fd3m space group. The lattice constant varies depending on the content of Fe, Si, or the like, but is preferably about 11.2 Å, for example. In addition, the matrix phase in which the precipitated particle is disposed preferably has a cubic crystal structure, and more preferably has a body-centered cubic crystal structure. The lattice constant varies depending on the element contained and its content, and for example, about 2.85 Å is preferable. Further, among the precipitated particle, it is preferable to have the precipitated particle oriented with respect to the matrix phase. The orientation relationship is preferably a relationship of $(0\text{-}40)_{particle}//(0\text{-}10)_{matrix\ phase}$ or $(\text{-}404)_{particle}//(\text{-}101)_{matrix\ phase}$, for example. More preferably, for example, $(0\text{-}40)_{particle}//(0\text{-}10)_{matrix\ phase}$ and $(\text{-}404)_{particle}//(\text{-}101)_{matrix\ phase}$ relations are provided. These orientation relationships are examples, and it is preferable to have an orientation relationship equivalent to the above. Further, it is preferable that 2 or more precipitated particles contained in one matrix phase are oriented with each other. In addition, it is preferable that the precipitated particle oriented with respect to the matrix phase has a lattice mismatch of 10% or less with respect to the matrix phase. More preferably, the lattice mismatch is 5% or less, more preferably 2% or less. In addition, when the precipitated particle has the $X_3Y_3C$ type cubic crystal structure and the matrix phase has the body-centered cubic crystal structure, lattice mismatch is calculated by the formula: lattice mismatch=|(precipitated particle's lattice constant)/4−(matrix phase's lattice constant)|/(matrix phase's lattice constant)×100(%). The inclusion of such particles in the magnetic material greatly improves mechanical properties such as strength and thermal stability by the mechanism of the precipitation strengthening.

The measurement method for examining the orientation relationship is not limited, but is performed by, for example, electron diffraction or the like. From the electron diffraction image or the like, if the "certain crystal plane" of the particles and the "certain crystal plane" of the matrix phase are parallel or substantially parallel to each other, it is determined that the particle and the matrix phase are oriented. Since (hkl) is parallel to (nh nk nl), for example (n is a positive or a negative integer), $(0\text{-}40)_{particle}//(0\text{-}10)_{matrix\ phase}$ has the same meaning as $(040)_{particle}//(010)_{matrix\ phase}$ $(040)_{particle}//(0\text{-}10)_{matrix\ phase}$, and $(0\text{-}40)_{particle}//(010)_{matrix\ phase}$, and has the same meaning as $(020)_{particle}//(0\text{-}10)_{matrix\ phase}$, $(020)_{particle}//(010)_{matrix\ phase}$, $(0\text{-}20)_{particle}//(010)_{matrix\ phase}$, and $(0\text{-}20)_{particle}//(0\text{-}10)_{matrix\ phase}$, and has the same meaning as $(010)_{particle}//(0\text{-}10)_{matrix\ phase}$, $(010)_{particle}//(010)_{matrix\ phase}$, $(0\text{-}10)_{particle}//(010)_{matrix\ phase}$, and $(0\text{-}10)_{particle}//(0\text{-}10)_{matrix\ phase}$.

It is preferable that first element X is Co and the second element Y is Ta. It is more preferable that the particle includes at least one of Fe and Si, and more preferably, both Fe and Si are included in the particle. In addition, it is preferable that the particle includes an element (excluding, for example, an obvious impurity element of less than 0.1%) included in the matrix phase in which the particle is disposed. As a result, the compositions of the precipitated particle and the matrix phase are similar to each other, so that the mechanical properties such as thermal stability, strength, hardness, and the like are improved, which is preferable.

The magnetic material includes at least one first element selected from the group consisting of Fe, Co and Ni. Meanwhile, it is more preferable that the magnetic material includes Fe and Co, and the amount of Co included therein is preferably from 10 at % to 60 at %, and more preferably from 10 at % to 40 at %, with respect to the total amount of Fe and Co. Thereby, appropriately high magnetic anisotropy is likely to be induced, and the magnetic characteristics (high permeability, low loss, etc.) are enhanced. Furthermore, it is preferable because a Fe—Co system can easily realize high saturation magnetization. Furthermore, when the composition range of Fe and Co is included in the above-described range, higher saturation magnetization can be realized, which is preferable.

It is preferable that the magnetic material include at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements. Thereby, thermal stability and oxidation resistance of the magnetic material can be increased. Among them, Al and Si are particularly preferable because these elements can easily form solid solutions with Fe, Co, and Ni, which are main components of the magnetic material, and Al and Si contribute to enhancements of thermal stability and oxidation resistance. Among them, Si is particularly preferable from the viewpoint of enhancements of thermal stability and oxidation resistance. The amount of the nonmagnetic metal is 1 at % or more and 25 at % or less with respect to the entire magnetic material, more preferably 5 at % or more and 20 at % or less, more preferably 5 at % or more and 15 at % or less is included.

It is preferable that the magnetic material has a precipitated particle including Ta (tantalum) and C (Carbon). By including such a precipitated particle in the magnetic material, the mechanical properties such as strength and thermal stability are greatly improved by the mechanism of precipitation strengthening. Incidentally, it is preferable that the precipitated particle also includes Co. It is more preferable that the precipitated particle include at least one of Fe and Si, and more preferably, both Fe and Si are included in the precipitated particle. In addition, it is preferable that the precipitated particle includes an element contained in the matrix phase in which the precipitated particle is disposed (excluding an apparent impurity element of, for example, less than 0.1%) As a result, the compositions of the precipitated particle and the matrix phase are similar to each other, so that the mechanical properties such as thermal stability, strength, hardness, and the like are improved, which is preferable.

It is preferable that the precipitated particle has a $Ta_3Co_3C$ of cubic crystal structure (preferably at least one of Fe and Si is included therein), and more preferably has a Fd3m space group. The lattice constant varies depending on the content of Fe, Si, or the like, but is preferably about 11.2 Å, for example. In addition, the matrix phase in which the precipitated particle is disposed preferably has a cubic crystal structure, and more preferably has a body-centered cubic crystal structure. The lattice constant varies depending on the element contained and its content, and for example, about 2.85 Å is preferable. Further, among the precipitated particle, it is preferable to have the precipitated particle oriented with respect to the matrix phase. It is preferable that the orientation relationship has, for example, a relationship of $(020)_{precipitated\ particle}//(0-10)_{matrix\ phase}$ or $(20-2)_{precipitated\ particle}//(-101)_{matrix\ phase}$. More preferably, for example, it is preferable to have a relation of $(020)_{precipitated\ particle}//(0-10)_{matrix\ phase}$ and $(20-2)_{precipitated\ particle}//(-101)_{matrix\ phase}$. Alternatively, it is preferable to have a relation of $(020)_{precipitated\ particle}//(010)_{matrix\ phase}$ or $(20-2)_{precipitated\ particle}//(10-1)_{matrix\ phase}$. More preferably, for example, it is preferable to have a relation of $(020)_{precipitated\ particle}//(010)_{matrix\ phase}$ and $(20-2)_{precipitated\ particle}//(10-1)_{matrix\ phase}$. These orientation relationships are examples, and it is preferable to have an orientation relationship equivalent to the above. Further, it is preferable that 2 or more precipitated particles included in one matrix phase are oriented with each other. In addition, it is preferable that the precipitated particle oriented with respect to the matrix phase has a lattice mismatch of 10% or less with respect to the matrix phase. More preferably, the lattice mismatch is 5% or less, more preferably 2% or less. In addition, when the precipitated particle has a cubic crystal structure of $Ta_3Co_3C$ and matrix phase has a body-centered cubic crystal structure, lattice mismatch is defined as follows: lattice mismatch=|(precipitated particle's lattice constant)/4−(matrix phase's lattice constant)|/(matrix phase's lattice constant)×100(%).

These are effective in improving the mechanical properties such as strength of magnetic material and thermal stability.

It is preferable that the average particle diameter of the precipitated particles is 1 nm or more and 10 μm or less, more preferably 1 nm or more and 1 μm or less, and still more preferably 1 nm or more and 100 nm or less. Thus, it is possible to improve the mechanical properties and thermal stability such as high strength, and low magnetic coercivity can be realized since the pinning of the domain wall is minimized (low hysteresis loss is possible). Further, the effect of reducing the eddy current loss by disposing the precipitated particle is also imparted. The average particle size can be determined by observing by TEM (Transmission Electron Microscope), SEM (Scanning Electron Microscope), or the like. Furthermore, it is also possible to determine the maximum length photographs with a computer. For all of them, it is preferable to determine the average particle size for ten or more precipitated particles in multiple views as the objects of measurement. It is preferable to determine the average particle size for as many precipitated particles as possible as the objects of measurement, because average information can be obtained. Furthermore, in a case in which it is not possible to observe ten or more precipitated particles, it is preferable that an observation of as many precipitated particles as possible is made, and average values obtained for those precipitated particles are employed.

In FIG. 1, the form of the precipitated particle is shown. It is preferable for the precipitated particle 2 to be disposed on the surface 8 of the magnetic material 100, or at the grain boundaries 6 of the matrix phase 4, or any at least one location within the grains of the matrix phase (surface, grain boundaries, in the grain). More preferably, two or more precipitated particles (surface and grain boundaries, surface and intragranular, grain boundaries and intragranular), are disposed, and more preferably, three precipitated particles are disposed in three places (surface and grain boundaries and intragranular). In particular, it is preferable that the precipitated particles are provided at the grain boundaries of the matrix phase. This makes it possible to increase the effect of "improvement of mechanical properties such as strength and thermal stability by precipitation strengthening".

In particular, it is preferable because the grain boundaries are strengthened, and the grain boundaries easily inhibit the progress of the grain boundary breakage by providing the precipitated particles at the grain boundaries. This makes it possible to these of "improvement of the mechanical properties such as strength and thermal stability by precipitation strengthening".

In the magnetic material, it is preferable that the Si ratio of the surface portion of the magnetic material is 1.1 times or more of the Si ratio of the central portion of the magnetic material. Thus, low magnetic coercivity and low hysteresis loss become possible, also eddy current loss is preferably suppressed because the surface becomes Si-rich.

Figure 2:
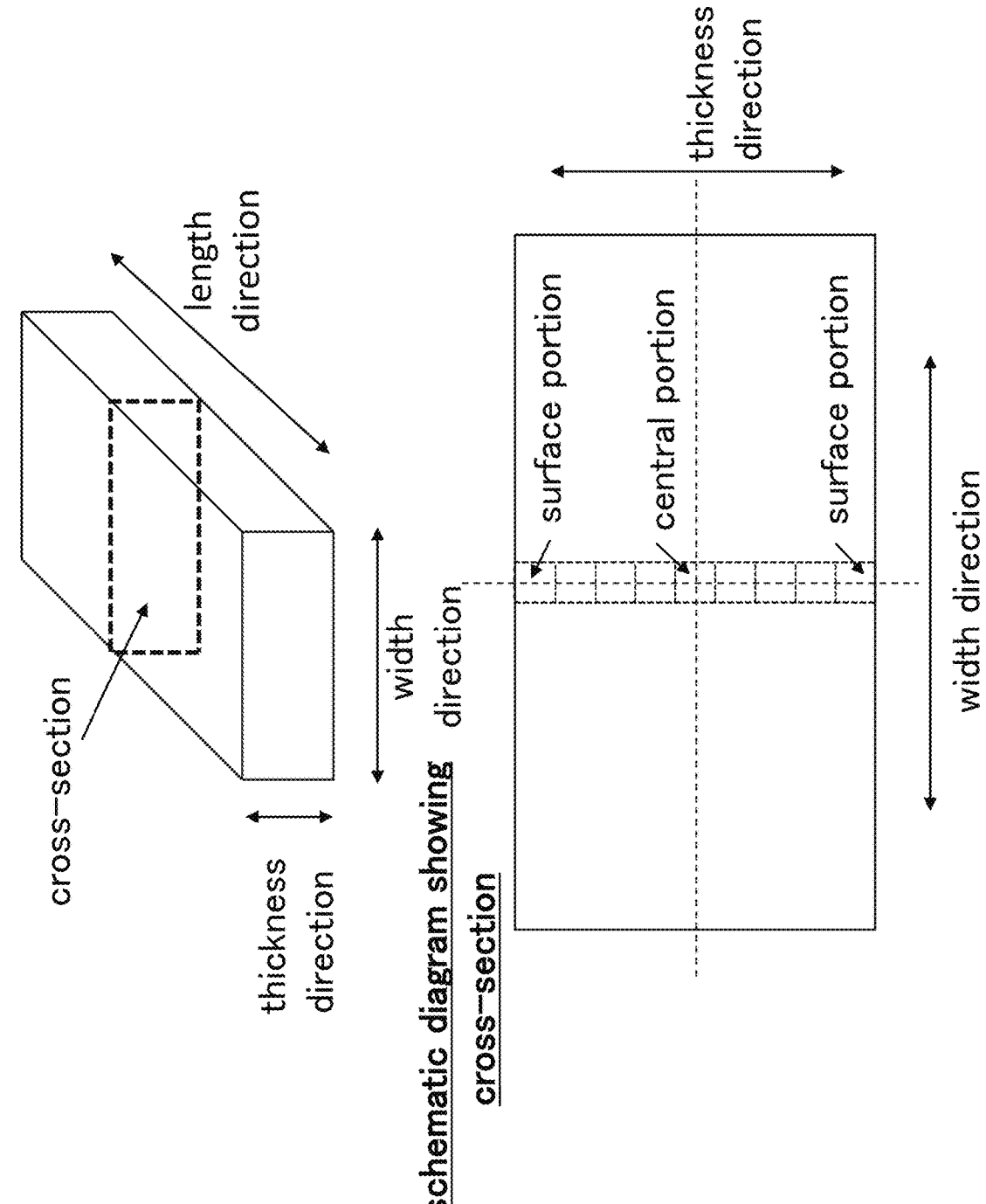
FIG. 2 is a schematic diagram showing a cross-section when evaluating Si ratio in the magnetic material of the first embodiment.

The Si ratio is preferably evaluated in the following manner. First, as shown in FIG. 2, the direction of the longest side in the magnetic material is referred to as the "length direction", the direction of the shortest side is referred to as the "thickness direction", and the direction of the side shorter than the side of the length direction and longer than the side of the thickness direction is referred to as the "width direction". At this time, a plane perpendicular to the length direction in the central portion in the length direction is referred to as a "cross-section". In this cross-section, it is divided into nine squares with respect to the center line in the thickness direction, and the Si ratio of the central portion and Si ratio of the surface portion (average of the two portions) is compared and evaluated. The Si ratio is evaluated by energy-dispersive X-ray spectroscopy (EDX: Energy Dispersive X-ray Spectroscopy) such as SEM, TEM.

Further, it is preferable that the first element is Fe and Co. The Si ratio is preferably 1 at % or more and 25 at % or less, more preferably 5 at % or more and 20 at % or less, and still more preferably 5 at % or more and 15 at % or less with respect to the total amount of the magnetic material. Thus, low magnetic coercivity and low hysteresis loss become possible, and it is preferable because the electrical resistivity can be set high the eddy current loss can be suppressed.

It is preferable that the density of the magnetic material is 6 $g/cm^3$ or more, more preferably 7 $g/cm^3$ or more, and even more preferably 7.5 $g/cm^3$ or more. The density can be evaluated, for example, by Archimedes method or simply by weight/volume measurement. Further, the relative density of the magnetic material is preferably 90% or more, more preferably 95% or more.

The magnetic material has preferably three-point bending (flexural) strength of 200 MPa or more, more preferably 300 MPa or more, and even more preferably 500 MPa or more, as the mechanical properties. The three-point bending (flexural) strength can be measured in accordance with a three-point bending test method defined in a standard such as JIS-R1601, for example.

The magnetic coercivity of the magnetic material is preferably equal to or less than 80 A/m, more preferably equal to or less than 40 A/m, and still more preferably equal to or less than 20 A/m. Thus, it is possible to low hysteresis loss. Meanwhile, magnetic coercivity can be evaluated conveniently by using a vibrating sample magnetometer (VSM) or the like. If the magnetic coercivity is low, the magnetic coercivity below 8 A/m (0.1 Oe) can also be measured by using a low magnetic field unit. When calculating the magnetic coercivity by VSM, it is possible to adopt a value obtained by dividing the difference between the magnetic field of the two points intersecting the horizontal axis (the magnetic field H1, H2 where the magnetization is zero) by 2 (i.e. magnetic coercivity=|H2−H1|/2 can be calculated).

The magnetic material preferably has a saturation magnetization of 1.7 T or more, more preferably 1.8 T or more. The mass saturation magnetization of the magnetic material is preferably 180 emu/g or more, more preferably 190 emu/g or more. Thereby, magnetic saturation is suppressed, and the magnetic characteristics can be sufficiently exhibited in the system, which is preferable.

With the above-described configuration, excellent magnetic properties such as high saturation magnetization, low magnetic coercivity, low loss (low hysteresis loss, low eddy current loss), high thermal stability, and excellent mechanical properties of high strength can be realized.

Next, the manufacturing method of magnetic material of the present embodiment will be described. Note that the manufacturing method is not particularly limited, and will be described as an example only.

As described above, the manufacturing methods of magnetic material of the present embodiment described below are merely exemplary. Therefore, the manufacturing process of precipitated particle of the present embodiment is not limited to the steps described below. Therefore, "precipitated particle" in the present embodiment is an example of "particle".

The first step is the step of preparation for molding. As an example, a magnetic metal ribbon is manufactured, heat-treated, and then pulverized and molded. In this case, in the production of the magnetic metal ribbon, for example, a film deposition system such as a roll quenching apparatus and a sputtering apparatus is used to produce. A roll quenching apparatus is desirable because it is suitable for mass synthesis. In particular, a single roll quenching apparatus is convenient and preferred. Further, when heat-treating the magnetic metal ribbon, in order to facilitate putting into an electric furnace for heat treatment, the ribbon may be cut to an appropriate size. For example, the ribbon may be cut to an appropriate size using a mixer device or the like. By performing the heat treatment, it is preferable to improve the grindability. The atmosphere of the heat treatment is preferably a vacuum atmosphere having a low oxygen concentration, an inert atmosphere, or a reducing atmosphere, and more preferably a reducing atmosphere such as $H_2$ (hydrogen), CO (carbon monoxide), or $CH_4$ (methane). The reason for this is that even if the magnetic metal ribbon is oxidized, it is possible to reduce the oxidized metal and return it to the metal by performing heat treatment in a reducing atmosphere. Thus, the magnetic metal ribbon which is oxidized and whose saturation magnetization is reduced is reduced, and it is also possible to restore the saturation magnetization of the magnetic metal ribbon. The heat-treated magnetic metal ribbon is pulverized to produce flaky magnetic metal particles. Before the present pulverizing, the magnetic metal ribbon or the thin film may be cut to an appropriate size using a mixer device or the like. In the present pulverization, for example, pulverization is performed by a pulverizer such as a bead mill or a planetary mill or a mixer. The type of the pulverizer is not particularly limited. For example, a planetary mill, a bead mill, a mixer rotating ball mill, a vibrating ball mill, a stirred ball mill (Atritor), a jet mill, a centrifugal separator, or a method of combining a mill and centrifugal separation can be used. The obtained flaky magnetic metal particles are molded. For example, molding is performed by uniaxial press molding, hot press molding, CIP molding, HIP molding or the like. The press pressure is preferably higher, and is preferably 10000 $kgf/cm^2$ or higher. Further, after performing the press once, performing heat treatment (e.g., 1000° C. heat treatment in a $H_2$ atmosphere), to perform the press again for a plurality of operations (e.g., 2 or more times), is preferable to perform densification (high density, saturation magnetization improvement). As a result, a molded body is obtained.

The second step is a step of heat-treating the obtained molded body. At this time, it is preferable to perform the heat treatment in a vacuum. At this time, when performing the heat treatment in a vacuum, it is preferable to dispose the molded body on the Ta foil.

Alternatively, the molded body is preferably disposed on an alloy foil including at least one of Nb foil, W foil, Mo foil, Ta, Nb, W, and Wo. Depending on the type of foil used, it is possible to control the composition of the particles precipitated during the heat treatment. When Ta foil is used, Ta is included in the particles. When Nb foil is used, Nb is included in the particles. When W foil is used, W is included in the particles. When Mo foil is used, Mo is included in the particles. Hereinafter, the case of Ta foil will be described as an example (the cases of Nb, W, and Mo are also the same as the case of Ta).

Heat treatment temperature is preferably 1100° C. or higher, more preferably 1200° C. or higher. The degree of vacuum is preferably higher, preferably lower than or equal to $10^{-1}$ Pa, more preferably lower than or equal to $10^{-2}$ Pa, and even more preferably lower than or equal to $10^{-3}$ Pa. In addition, it is preferable that carbon is disposed around the inside of the furnace in which the heat treatment is performed.

In addition, when a vacuum pump is used to realize high vacuum during heat treatment, it is preferable to use an oil containing carbon such as alkyl naphthalene as an oil of an oil rotary pump or an oil diffusion pump (the oil flows back into the furnace and evaporates to generate carbon).

Thus, during vacuum heat treatment, Fe, Co, Si or the like is partially evaporated, and sintering proceeds. At this time, because Fe and Co are more easily evaporated than Si (because the vapor pressure is high), the composition deviates from the raw material composition (slightly Si-rich and Fe, Co-poor) after sintering. The surface of the material is, in particular, slightly Si-rich and Fe, Co-poor compared to the center. Further, during the vacuum heat treatment, Ta diffuses from Ta foil into the material, and the carbon in the furnace or the atmosphere also diffuses into the material. The above described behavior occurs only when Ta foil is heat treated at a high temperature in vacuum with carbon disposed in the furnace or atmosphere. By the vacuum heat treatment described above, the precipitated particle of Ta—Co—C (including Fe and Si) is generated in the matrix phase. Although it is preferable that Ta and C are included in the raw material composition, as described above, the precipitated particle can be produced by incorporating Ta and C in the process even if Ta and C are not included in the raw material composition. A precipitated particle having a $Ta_3Co_3C$ of cubic crystal structure (including Fe, Si) is generated by setting an appropriate degree of vacuum and heat treatment temperature. Further, the precipitated particle is oriented with respect to the matrix phase, and the lattice mismatch is lowered. In addition, it is preferable that the lattice strain of the obtained magnetic material be appropriately removed by heat treatment. The heat treatment at this time is preferably in an inert atmosphere or a reducing atmosphere, more preferably in a reducing atmosphere such as $H_2$, CO, $CH_4$.

Since the magnetic material produced by the above-described production process is obtained by sintering a pressed powder body (molded body), it can be applied to complicated shapes. On the other hand, in the first step, an electromagnetic steel sheet (silicon steel sheet) whose composition is adjusted may be prepared as it is. Thereafter, the magnetic material of the present embodiment can be obtained by subjecting the electrical steel sheet (silicon steel sheet) to heat treatment in a vacuum in the second step.

According to the present embodiment, it is possible to provide the magnetic material having excellent magnetic properties such as low magnetic loss, excellent mechanical properties such as high strength, and a thermal stability.

Second Embodiment

Figure 3:
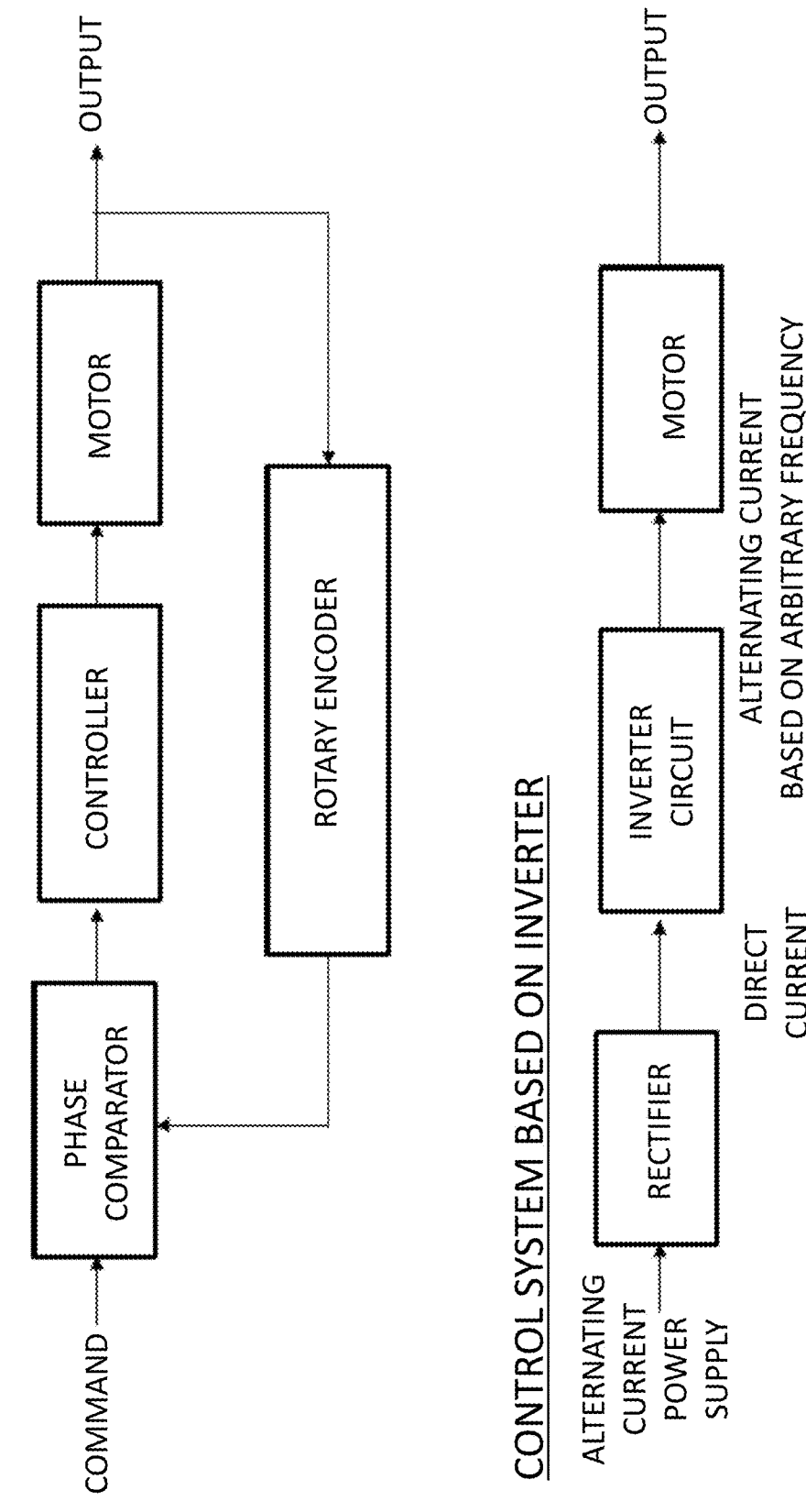
FIG. 3 is a conceptual diagram of a motor system according to a second embodiment.

A system and a device apparatus of the present embodiment have the magnetic material of the first embodiment. Therefore, any matters that overlap with the first embodiment will not be described herein. Examples of the component parts of the magnetic material included in these system and device apparatus include cores for rotating electric machines such as various motors and generators (for example, motors and generators), potential transformers, inductors, transformers, choke coils, and filters; and magnetic wedges for a rotating electric machine. FIG. 3 is a conceptual diagram of a motor system of a second embodiment. A motor system is an example of the rotating electric machine system. A motor system is one system including a control system for controlling the rotational frequency or the electric power (output power) of a motor. Regarding the mode for controlling the rotational frequency of a motor, there are control methods that are based on control by a bridge servo circuit, proportional current control, voltage comparison control, frequency synchronization control, and phase locked loop (PLL) control. As an example, a control method based on PLL is illustrated in FIG. 3. A motor system that controls the rotational frequency of a motor based on PLL comprises a motor; a rotary encoder that converts the amount of mechanical displacement of the rotation of the motor into electrical signals and detects the rotational frequency of the motor; a phase comparator that compares the rotational frequency of the motor given by a certain command, with the rotational frequency of the motor detected by the rotary encoder, and outputs the difference of those rotational frequencies; and a controller that controls the motor so as to make the difference of the rotational frequencies small. On the other hand, examples of the method for controlling the electric power of the motor include control methods that are based on pulse width modulation (PWM) control, pulse amplitude modulation (PAM) control, vector control, pulse control, bipolar drive, pedestal control, and resistance control. Other examples of the control method include control methods based on microstep drive control, multiphase drive control, inverter control, and switching control. As an example, a control method using an inverter is illustrated in FIG. 3. A motor system that controls the electric power of the motor using an inverter includes an alternating current power supply; a rectifier that converts the output of the alternating current power supply to a direct current; an inverter circuit that converts the direct current to an alternating current based on an arbitrary frequency; and a motor that is controlled by this alternating current.

Figure 4:
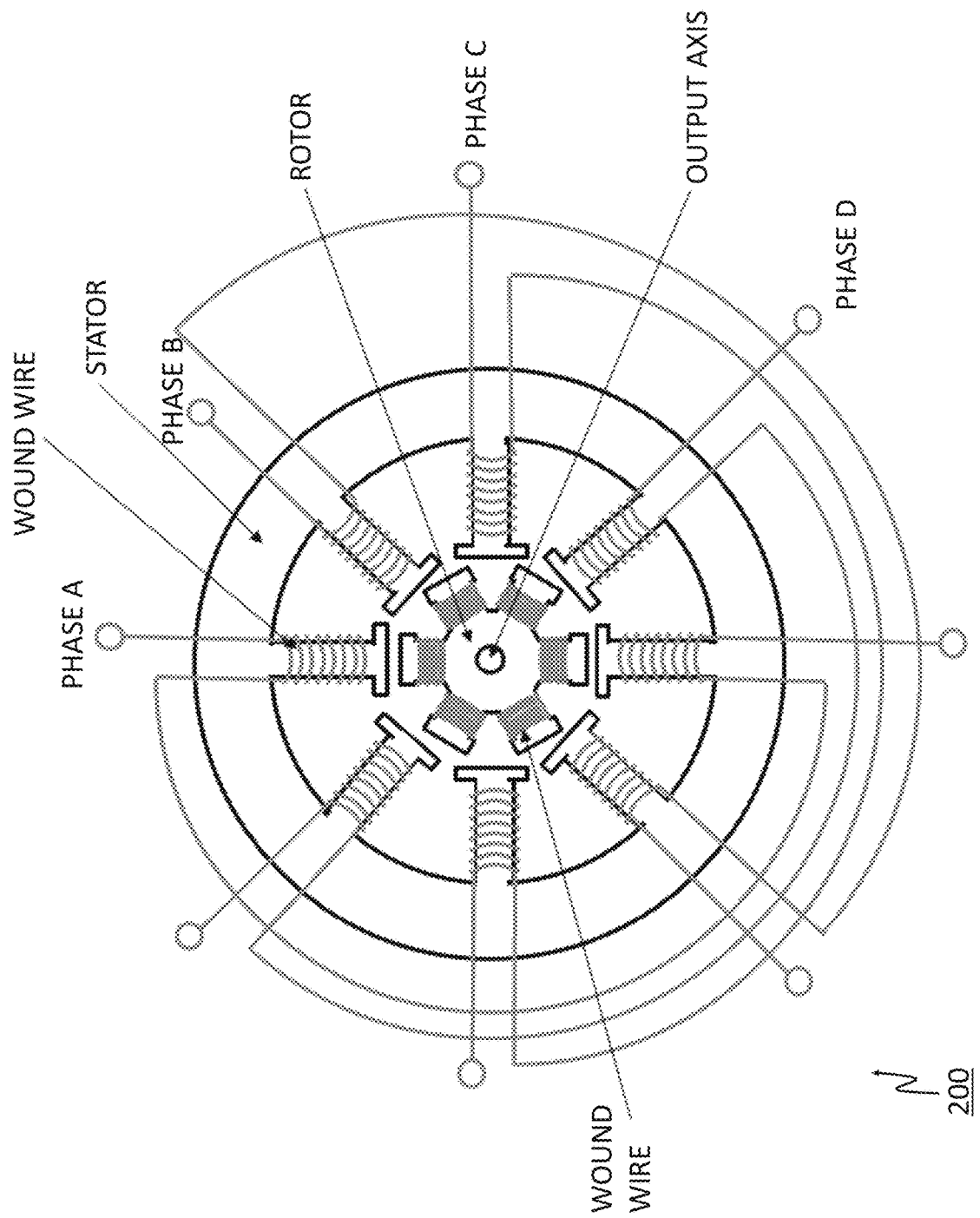
FIG. 4 is a conceptual diagram of a motor according to the second embodiment.

FIG. 4 illustrates a conceptual diagram of a motor according to the second embodiment. A motor 200 is an example of the rotating electric machine. In the motor 200, a first stator (magneto stator) and a second rotor (rotator) are disposed. The diagram illustrates an inner rotor type motor in which a rotor is disposed on the inner side of a stator; however, an outer rotor type in which the rotor is disposed on the outer side of the stator may also be used.

Figure 5:
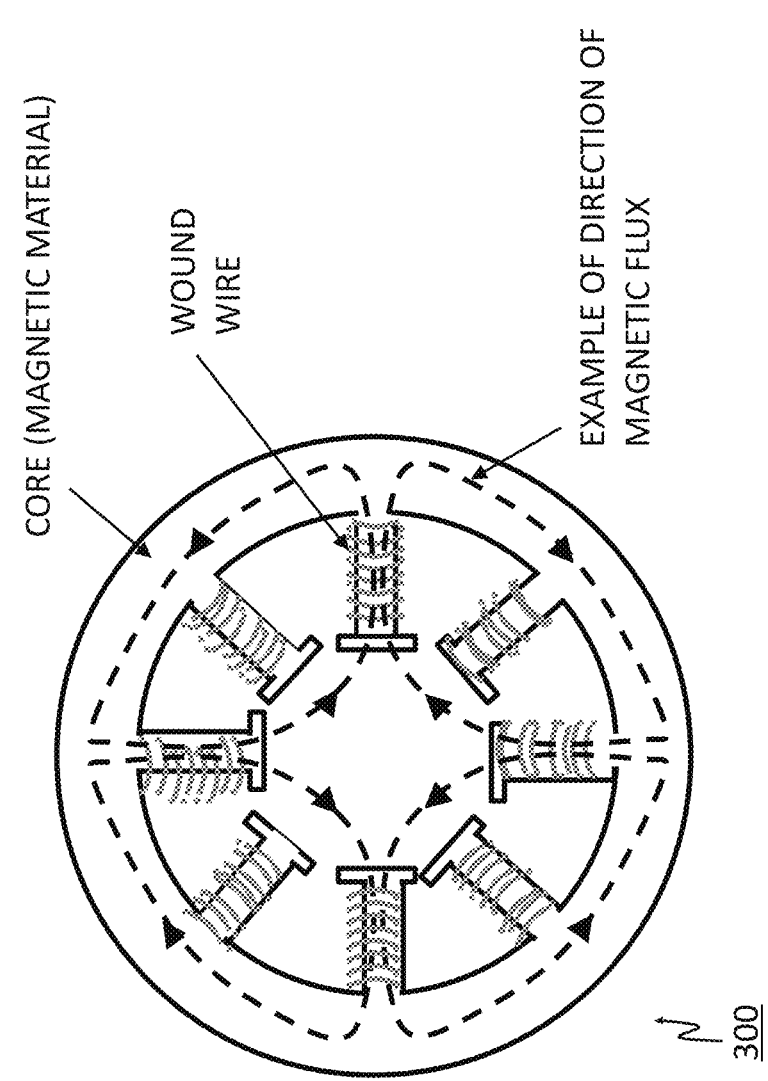
FIG. 5 is a conceptual diagram of a motor core (stator) according to the second embodiment.
Figure 6:
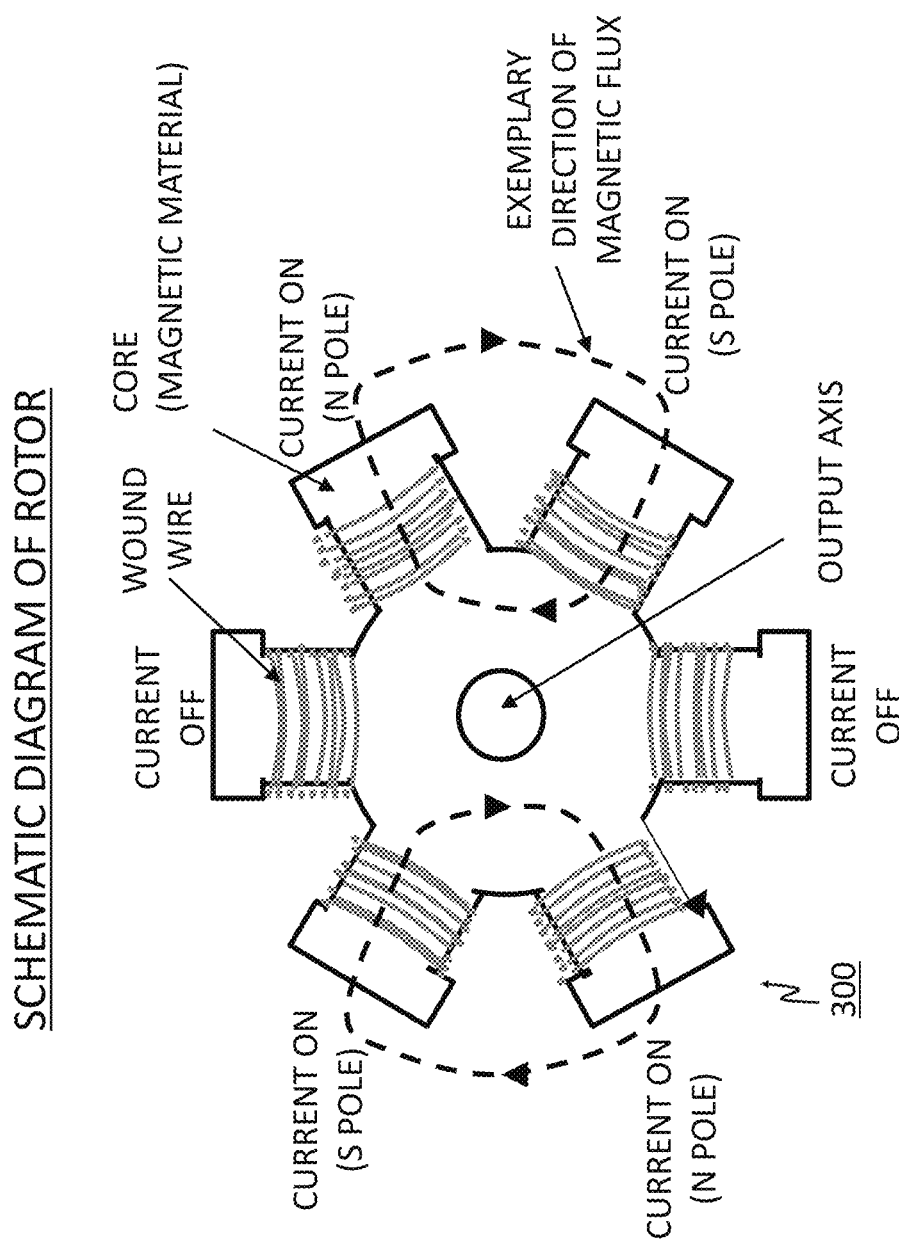
FIG. 6 is a conceptual diagram of a motor core (rotor) according to the second embodiment.

FIG. 5 is a conceptual diagram of a motor core (stator) according to the second embodiment. FIG. 6 is a conceptual diagram of a motor core (rotor) according to the second embodiment. Regarding the motor core 300 (core of a motor), the cores of a stator and a rotor correspond to the motor core. This will be described below. FIG. 5 is an exemplary conceptual cross-sectional diagram of a first stator. The first stator has a core and coils. The coils are wound around some of the protrusions of the core, which are provided on the inner side of the core. In this core, the magnetic material of the first embodiment can be disposed. FIG. 6 is an exemplary conceptual cross-sectional diagram of the first rotor. The first rotor has a core and coils. The coils are wound around some of the protrusions of the core, which are provided on the outer side of the core. In this core, the magnetic material of the second embodiment can be disposed.

FIG. 5 and FIG. 6 are intended only for illustrative purposes to describe examples of motors, and the applications of the magnetic material are not limited to these. The magnetic material can be applied to all kinds of motors as cores for making it easy to lead the magnetic flux.

Figure 7:
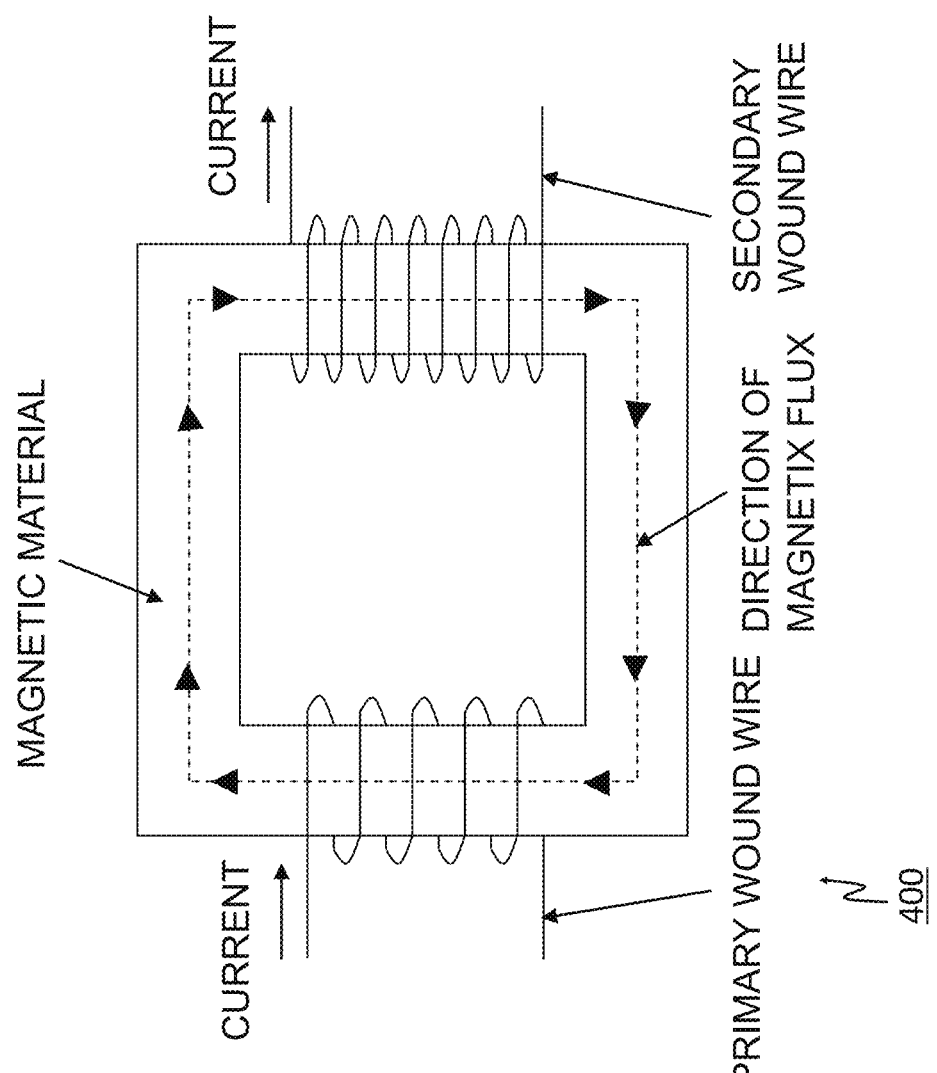
FIG. 7 is a conceptual diagram of a potential transformer or a transformer according to the second embodiment.
Figure 9:
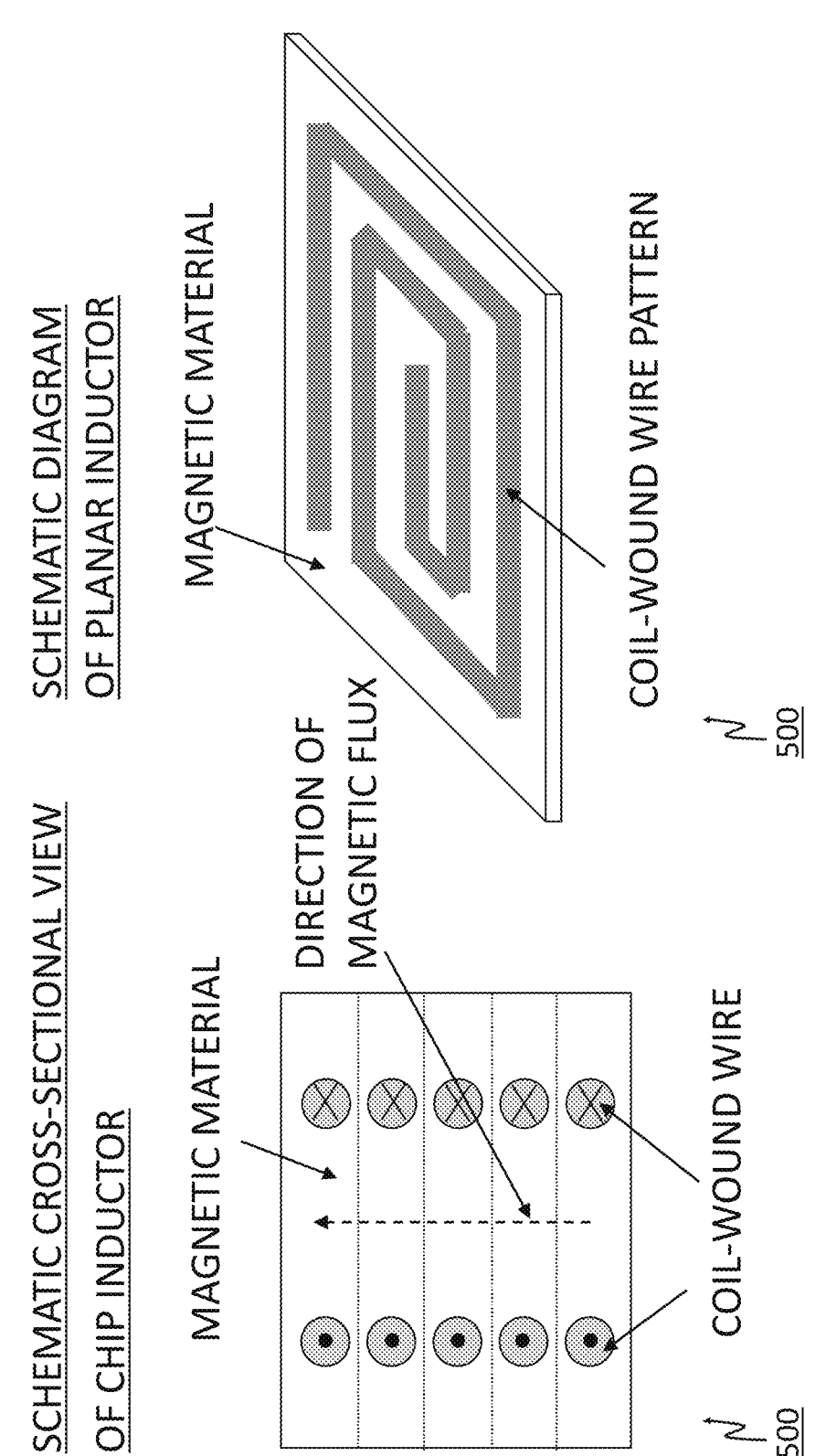
FIG. 9 is a conceptual diagram of inductors (chip inductor and planar inductor) according to the second embodiment.

FIG. 7 is a conceptual diagram of a potential transformer or a transformer according to the second embodiment. FIG. 8 is a conceptual diagram of inductors (ring-shaped inductor and rod-shaped inductor) according to the second embodiment. FIG. 9 is a conceptual diagram of inductors (chip inductor and planar inductor) according to the second embodiment. These diagrams are also intended only for illustrative purposes. Also for the potential transformer or transformer 400 and the inductor 500, similarly to the motor core, the magnetic materials can be applied to all kinds of potential transformers or transformers and inductors in order to make it easy to lead the magnetic flux or to utilize high magnetic permeability.

Figure 10:
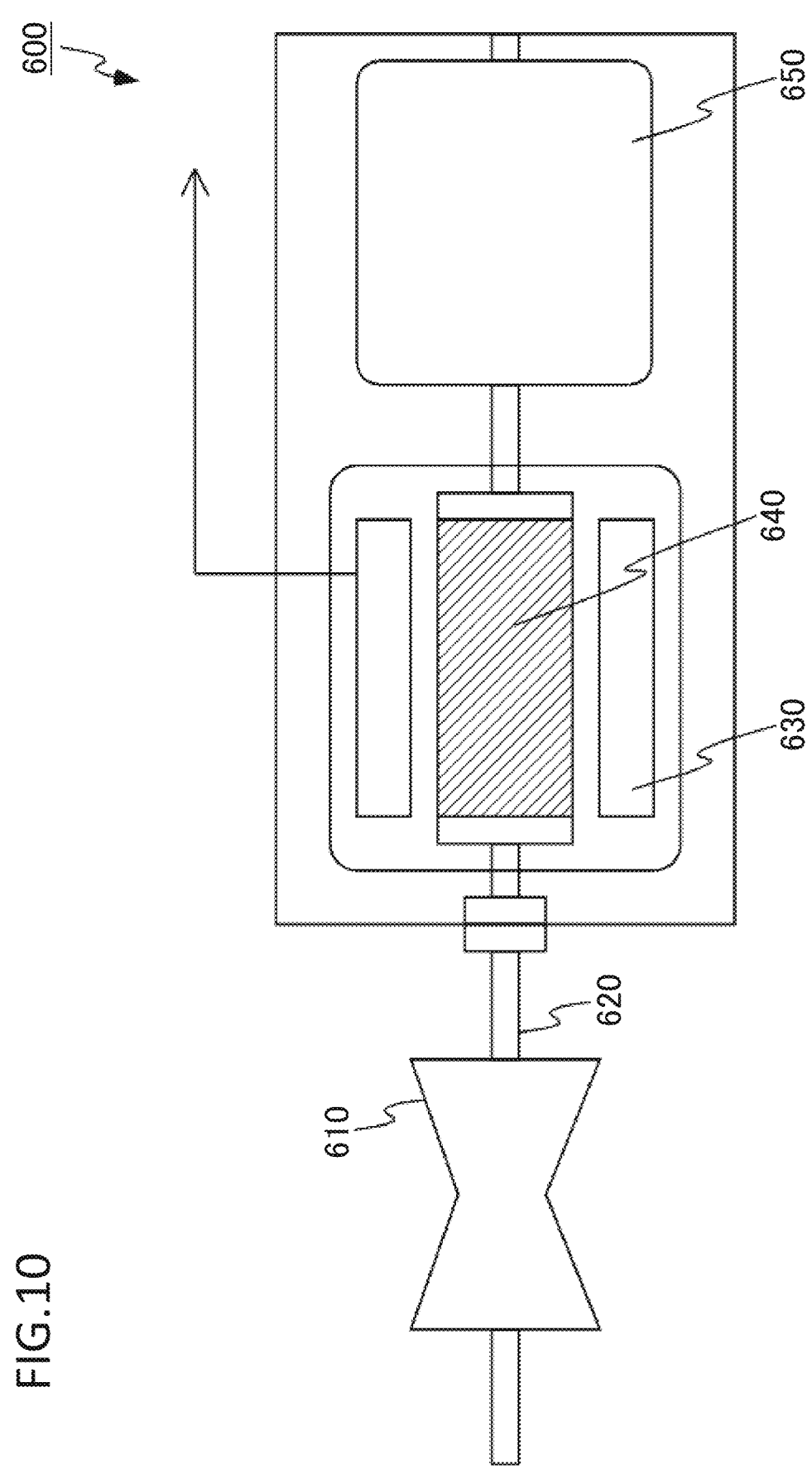
FIG. 10 is a conceptual diagram of a generator according to the second embodiment.

FIG. 10 is a conceptual diagram of a generator 600 according to the second embodiment. The generator 600 is an example of the rotating electric machine. The generator 600 includes either or both of a second stator (magneto stator) 630 that uses the magnetic material according to the first embodiment as the core; and a second rotor (rotator) 640 that uses the magnetic material according to the first embodiment as the core. In the diagram, the second rotor (rotator) 640 is disposed on the inner side of the second stator 630; however, the second rotor may also be disposed on the outer side of the second stator. The second rotor 640 is connected to a turbine 610 provided at an end of the generator 600 through a shaft 620. The turbine 610 is rotated by, for example, a fluid supplied from the outside, which is not illustrated in the diagram. Meanwhile, instead of the turbine that is rotated by a fluid, the shaft can also be rotated by transferring dynamic rotation of the regenerative energy of an automobile or the like. Various known configurations can be employed for the second stator 630 and the second rotor 640. Meanwhile, in the second rotor 640, an electrostatic charge is generated due to an axial current generated concomitantly with the static electricity from the turbine 610 or with power generation. Therefore, the generator 600 includes a brush 650 intended for discharging the electrostatic charge of the second rotor 640.

The shaft is in contact with a commutator (not illustrated in the diagram) that is disposed on the opposite side of the turbine with respect to the second rotor. The electromotive force generated by rotation of the second rotor is transmitted, as the electric power of the generator, after undergoing a voltage increase to the system voltage by means of an isolated phase bus that is not illustrated in the diagram, and a main transformer that is not illustrated in the diagram. Meanwhile, in the second rotor, an electrostatic charge is generated due to an axial current generated concomitantly with the static electricity from the turbine or with power generation. Therefore, the generator includes a brush intended for discharging the electrostatic charge of the second rotor.

The rotating electric machine of the present embodiment can be preferably used in railway vehicles. For example, the rotating electric machine can be preferably used in the motor 200 that drives a railway vehicle, or the generator 500 that generates electricity for driving a railway vehicle.

The rotating electric machine of the present embodiment can be preferably used in various generators.

In order for the magnetic material to be applied to these systems and device apparatuses described above, the magnetic material is allowed to be subjected to various kinds of processing. For example, in the case of a sintered body, the magnetic material is subjected to mechanical processing such as polishing or cutting; and in the case of a powder, the magnetic material is mixed with a resin such as an epoxy resin or polybutadiene. If necessary, the magnetic material is further subjected to a surface treatment. Also, if necessary, a coiling treatment is carried out.

When the system and device apparatus of the present embodiment are used, a motor system, a motor, a potential transformer, a transformer, an inductor, and a generator, all having excellent characteristics (high efficiency and low losses), can be realized.

EXAMPLES

Hereinafter, embodiments will be described in more detail by comparing Examples 1 to 4 with Comparative Example 1. For the magnetic materials obtainable by Examples and Comparative Example that will be described below, a summary of the presence of the precipitated particles, the composition of the precipitated particles, the crystal structure of the precipitated particles, the presence of the orientation of the precipitated particles, the lattice mismatch between the precipitated particles and the matrix phase, and the average particle size of the precipitated particles, is shown in Table 1.

Example 1

First, a ribbon of Fe—Co—Si—Ta—C ($Fe_{70}Co_{30}$ (atomic %)–5 wt % Si) is produced using a single roll quenching device. Next, the ribbon thus obtained is subjected to a heat treated at 300° C. in a $H_2$ atmosphere. The ribbon is then pulverized using a mixer apparatus to obtain flaky magnetic metal particles. Thereafter, the obtained flaky magnetic metal particles are subjected to uniaxial press molding by 12000 kgf/cm², and heat treatment is performed at 1000° C. in a $H_2$ atmosphere. Thereafter, uniaxial press molding and 1000° C. heat treatment in $H_2$ atmosphere are repeated 5 times to obtain a molded body. Thereafter, the molded body was placed on the Ta foil, and heat treatment was performed at 1200° C. in vacuum ($10^2$ Pa or less) (carbon was placed in the furnace), and then heat treatment was performed at 1000° C. in an $H_2$ atmosphere to obtain the magnetic material. The average particle size of the precipitated particles contained in the obtained magnetic material was about 10 nm. The lattice mismatch between the precipitated particles and the matrix phase was about 1%.

Example 2

The procedure is almost the same as in Example 1, except that the heat treatment conditions in vacuum are controlled, and thereby the average particle size of the precipitated particles was about 100 nm. At this time, the lattice mismatch between the precipitated particle and the matrix phase was about 2%.

Example 3

The procedure is almost the same as in Example 1, except that the heat treatment conditions in vacuum are controlled, and thereby the average particle size of the precipitated particles was about 1 μm. At this time, the lattice mismatch between the precipitated particle and the matrix phase was about 5%.

Example 4

The procedure is almost the same as in Example 1, except that the heat treatment conditions in vacuum are controlled, and thereby the average particle size of the precipitated particles was about 2 μm. At this time, the precipitated particles and the matrix phase were not oriented.

Examples 5

The procedure is almost the same as in Example 1, except that Fe—Co—Si—Nb—C ($Fe_{70}Co_{30}$ (atomic %)–5 wt % Si) is used instead of Fe—Co—Si—Ta—C ($Fe_{70}Co_{30}$ (atomic %)–5 wt % Si), and a Nb foil is used instead of the Ta foil. The average particle size of the precipitated particles contained in the obtained magnetic material was about 10 nm. The lattice mismatch between the precipitated particles and the matrix phase was about 1%.

Examples 6

The procedure is almost the same as in Example 1, except that Fe—Co—Si—W—C ($Fe_{70}Co_{30}$ (atomic %)–5 wt % Si) is used instead of Fe—Co—Si—Ta—C ($Fe_{70}Co_{30}$ (atomic %)–5 wt % Si), and a W foil is used instead of the Ta foil. The average particle size of the precipitated particles contained in the obtained magnetic material was about 10 nm. The lattice mismatch between the precipitated particles and the matrix phase was about 1%.

Examples 7

The procedure is almost the same as in Example 1, except that Fe—Co—Si—Mo—C ($Fe_{70}Co_{30}$ (atomic %)–5 wt % Si) is used instead of Fe—Co—Si—Ta—C ($Fe_{70}Co_{30}$ (atomic %)–5 wt % Si), and a Mo foil is used instead of the Ta foil. The average particle size of the precipitated particles contained in the obtained magnetic material was about 10 nm. The lattice mismatch between the precipitated particles and the matrix phase was about 1%.

Comparative Example 1

The procedure is almost the same as in Example 1, except that the composition is Fe—Co—Si ($Fe_{70}Co_{30}$ (atomic %)−5 wt % Si), the Ta foil is not used during the heat treatment, and the atmosphere is Ar atmosphere. No precipitated particle was found in the resulting magnetic material.

Next, with respect to the evaluation magnetic material of Examples 1 to 5 and Comparative Example 1, saturation magnetization, magnetic coercivity, core loss, bending strength (three-point bending (flexural) strength), the rate of change over time of the bending strength (three-point bending (flexural) strength) are evaluated. The rate of change over time in core loss and bending (flexural) strength are evaluated by the following method. The evaluation results are shown in Table 2.

(1) Core loss: the core loss at an operating condition at 100 Hz and 1 T is measured using a B-H analyzer. Incidentally, if it cannot be measured directly under the condition of 100 Hz and 1 T, the frequency dependence and the magnetic flux density dependence of the core loss are measured, and the core loss at 100 Hz and 1 T is estimated (and the estimated value is adopted).

(2) The rate of change over time in bending (flexural) strength: after heating the sample for evaluation at a temperature of 100° C. for 100 hours in the atmosphere, the bending (flexural) strength is measured, and the rate of change over time (bending (flexural) strength after heating for 100 hours/bending (flexural) strength without heating) is determined.

TABLE 2

| | Saturation Magnetization (T) | Magnetic Coercivity (A/m) | Core loss (kW/m³) | Bending strength (MPa) | Rate of change over time of bending strength (%) |
|---|---|---|---|---|---|
| Example 1 | 1.85 | 20 | 40 | 800 | 99 |
| Example 2 | 1.85 | 22 | 43 | 750 | 98 |
| Example 3 | 1.86 | 24 | 46 | 730 | 98 |
| Example 4 | 1.86 | 30 | 50 | 600 | 97 |
| Example 5 | 1.85 | 22 | 42 | 780 | 98 |
| Example 6 | 1.85 | 21 | 44 | 770 | 99 |
| Example 7 | 1.85 | 22 | 43 | 790 | 98 |
| Comparative Example 1 | 1.9 | 60 | 62 | 300 | 94 |

As can be seen from Table 1, the magnetic materials of Examples 1 to 4 contained precipitated particle of $Ta_3Co_3C$ ($X_3Y_3C$) cubic crystal structure in Ta—Fe—Co—Si—C composition. Further, in Examples 1 to 3, precipitated particle was oriented with respect to matrix phase. The lattice mismatch was 10% or less. The average particle size of the precipitated particles was 1 nm or more and 1 μm or less. In Example 4, precipitated particle was not oriented with respect to the matrix phase, and the average particle size of the precipitated particles was as large as about 2 μm. On the other hand, in Comparative Example 1, precipitated particle was not generated.

The magnetic material of Example 5 was Nb—Fe—Co—Si—C composition, the magnetic material of Example 6 was W—Fe—Co—Si—C composition, and the magnetic mate-

TABLE 1

| | Presence of precipitated particle | Composition of precipitated particle | Crystal structure of precipitated particle | Presence of orientation of precipitated particle | Lattice mismatch between precipitated particle and matrix phase | Average particle size of precipitate particles |
|---|---|---|---|---|---|---|
| Example 1 | PRESENT | Ta—Fe—Co—Si—C | $Ta_3Co_3C$ cubic crystal type | PRESENT | 1% | About 10 nm |
| Example 2 | PRESENT | Ta—Fe—Co—Si—C | $Ta_3Co_3C$ cubic crystal type | PRESENT | 2% | About 100 nm |
| Example 3 | PRESENT | Ta—Fe—Co—Si—C | $Ta_3Co_3C$ cubic crystal type | PRESENT | 5% | About 1 μm |
| Example 4 | PRESENT | Ta—Fe—Co—Si—C | $Ta_3Co_3C$ cubic crystal type | ABSENT | — | About 2 μm |
| Example 5 | PRESENT | Nb—Fe—Co—Si—C | $X_3Y_3C$ cubic crystal type | PRESENT | 1% | About 10 nm |
| Example 6 | PRESENT | W—Fe—Co—Si—C | $X_3Y_3C$ cubic crystal type | PRESENT | 1% | About 10 nm |
| Example 7 | PRESENT | Mo—Fe—Co—Si—C | $X_3Y_3C$ cubic crystal type | PRESENT | 1% | About 10 nm |
| Comparative Example 1 | ABSENT | . . . | . . . | . . . | . . . | . . . | rial of Example 7 was Mo—Fe—Co—Si—C composition, and all contained the precipitated particle of $X_3Y_3C$ cubic crystal structure. Further, the precipitated particle was oriented with respect to the matrix phase, and lattice mismatch was also 10% or less. The average particle size of the precipitated particles was 1 nm or more and 1 μm or less.

As is apparent from Table 2, it can be seen that the magnetic materials of Examples 1 to 7 are superior to those of Comparative Example 1 in saturated magnetization, magnetic coercivity, iron loss, bending (flexural) strength, and the rate of change with time of the bending (flexural) strength. That is, it can be seen that magnetic material of Examples 1 to 4 are superior in magnetic properties, thermal stability, mechanical properties (strength). In particular, among Examples 1 to 4, Examples 1 to 3 are found to be superior in magnetic properties, thermal stability, and mechanical properties (strength) as compared with Example 4.

These results are provided by the inclusion of the precipitated particle of $Ta_3Co_3C$ cubic crystal structure in Ta—Fe—Co—Si—C formulation. In addition, the precipitated particle is oriented with respect to the matrix phase, the lattice mismatch is low, and the average particle size of the precipitated particles is 1 nm or more and 1 μm or less, thereby characteristics are further improved.

Alternatively, the above results are obtained by the inclusion of the precipitated particle of $X_3Y_3C$ cubic crystal structure in Ta (Nb, W, Mo)—Fe—Co—Si—C components. In addition, the precipitated particle is oriented with respect to the matrix phase, the lattice mismatch is low, and the average particle size of the precipitated particles is 1 nm or more and 1 μm or less, thereby characteristics are further improved.

While certain embodiments have been described, these embodiments have been presented by way of example only, and are not intended to limit the scope of the inventions. Indeed, magnetic material and rotating electric machine described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

The above-described embodiments can be summarized in the following clauses.

Clause 1

A magnetic material including at least one first element X selected from the group consisting of Fe, Co and Ni;
a matrix phase; and
a particle including C and at least one second element Y selected from Ta, W, Nb and Mo.

Clause 2

The magnetic material according to clause 1, wherein the particle includes a cubic crystal structure and includes the first element X, and includes a compound phase of $X_3Y_3C$ type.

Clause 3

The magnetic material according to clause 1 or 2, wherein the particle is present at a grain boundary of the matrix phase.

Clause 4

The magnetic material according to any one of clauses 1 to 3, wherein the first element X is Co and the second element Y is Ta.

Clause 5

The magnetic material according to any one of clauses 1 to 4, wherein the particle includes at least one of Fe or Si.

Clause 6

The magnetic material according to any one of clauses 1 to 5, wherein the particle includes an element included in the matrix phase in which the particle is provided.

Clause 7

The magnetic material according to any one of clauses 1 to 6, wherein the particle has a cubic crystal structure of $Ta_3Co_3C$.

Clause 8

The magnetic material according to any one of clauses 1 to 7, wherein the matrix phase includes a body-centered cubic crystal structure, and the particle is provided in the matrix phase.

Clause 9

The magnetic material according to any one of clauses 1 to 8, wherein the particle is oriented with respect to the matrix phase.

Clause 10

The magnetic material according to clause 9, wherein the particle oriented with respect to the matrix phase has a lattice mismatch of 10% or less with respect to the matrix phase.

Clause 11

The magnetic material according to clauses 9 or 10, wherein two or more of the particles included in the matrix phase are oriented with respect to each other.

Clause 12

The Magnetic material according to any one of clauses 9 to 11, wherein the particle is oriented at $(020)_{particle}//(0\text{-}10)_{matrix\ phase}$ or $(20\text{-}2)_{particle}//(-101)_{matrix\ phase}$ with respect to the matrix phase.

Clause 13

The Magnetic material according to any one of clauses 9 to 12, wherein the particle is oriented at $(0\text{-}40)_{particle}//(0\text{-}10)_{matrix\ phase}$ or $(-404)_{particle}//(-101)_{matrix\ phase}$ with respect to the matrix phase.

Clause 14

The magnetic material according to any one of clauses 1 to 13, wherein the mean particle size of the particles is 1 nm or more and 10 μm or less.

Clause 15

The magnetic material according to any one of clauses 1 to 14, wherein a Si ratio of a surface portion of the magnetic material is 1.1 times or more with respect to a Si ratio of a central portion of the magnetic material.

Clause 16

The magnetic material according to any one of clauses 1 to 15, wherein the first element is Fe and Co, and a ratio of Si is 1 atomic % or more and 25 atomic % or less with respect to the entire magnetic material.

Clause 17

The magnetic material according to any one of clauses 1 to 16, wherein a density of the magnetic material is 6 g/cm³ or higher.

Clause 18

The magnetic material according to any one of clauses 1 to 17, wherein the three-point bending strength of the magnetic material is 200 MPa or more.

Clause 19

The magnetic material according to any one of clauses 1 to 18, wherein a magnetic coercivity is less than or equal to 80 A/m.

Clause 20

The magnetic material according to any one of clauses 1 to 19, wherein a saturation magnetization of the magnetic material is 1.7 T or more.

Clause 21

A rotating electric machine including the magnetic material according to any one of clauses 1 to 20.

What is claimed is:

1. A magnetic material comprising Si and at least one first element X selected from the group consisting of Fe, Co and Ni;
a matrix phase; and
a particle including the first element X, C and at least one second element Y selected from Ta, W, Nb and Mo,
wherein a ratio of Si is 1 atomic % or more and 25 atomic % or less with respect to the entire magnetic material.

2. The magnetic material according to claim 1, wherein the particle includes a cubic crystal structure and includes a compound phase comprising $X_3Y_3C$.

3. The magnetic material according to claim 1, wherein the particle is present at a grain boundary of the matrix phase.

4. The magnetic material according to claim 1, wherein the first element X is Co and the second element Y is Ta.

5. The magnetic material according to claim 1, wherein the particle includes at least one of Fe or Si.

6. The magnetic material according to claim 1, wherein the particle includes an element included in the matrix phase in which the particle is provided.

7. The magnetic material according to claim 1, wherein the particle has a cubic crystal structure of $Ta_3Co_3C$.

8. The magnetic material according to claim 1, wherein the matrix phase includes a body-centered cubic crystal structure, and the particle is provided in the matrix phase.

9. The magnetic material according to claim 1, wherein the particle lattice is oriented with respect to the matrix phase lattice.

10. The magnetic material according to claim 9, wherein the particle oriented with respect to the matrix phase has a lattice mismatch of 10% or less with respect to the matrix phase.

11. The magnetic material according to claim 9, wherein two or more of the particles included in the matrix phase are lattice oriented with respect to each other.

12. The magnetic material according to claim 9, wherein the particle lattice is oriented at $(020)_{particle}//(0\text{-}10)_{matrix\ phase}$ or $(20\text{-}2)_{particle}//(-101)_{matrix\ phase}$, with respect to the matrix phase lattice.

13. The magnetic material according to claim 9, wherein the particle lattice is oriented at $(0\text{-}40)_{particle}/(0\text{-}10)_{matrix\ phase}$ or $(404)_{particle}//(-101)_{matrix\ phase}$ with respect to the matrix phase lattice.

14. The magnetic material according to claim 1, wherein a plurality of particles are included in the magnetic material, and the mean particle size of the particles is 1 nm or more and 10 μm or less.

15. The magnetic material according to claim 1, wherein a Si ratio of a surface portion of the magnetic material is 1.1 times or more with respect to a Si ratio of a central portion of the magnetic material.

16. The magnetic material according to claim 1, wherein the first element is Fe and Co, and a ratio of Si is 1 atomic % or more and 25 atomic % or less with respect to the entire magnetic material.

17. The magnetic material according to claim 1, wherein a density of the magnetic material is 6 g/cm³ or higher.

18. The magnetic material according to claim 1, wherein a three-point bending strength of the magnetic material is 200 MPa or more.

19. The magnetic material according to claim 1, wherein a magnetic coercivity is 80 A/m or less.

20. The magnetic material according to claim 1, wherein a saturation magnetization of the magnetic material is 1.7 T or more.

21. The magnetic material according to claim 1, wherein the particle is present at a surface of the magnetic material, at a grain boundary of the matrix phase or in a grain of the matrix material.

22. A rotating electric machine comprising the magnetic material according to claim 1.

* * * * *